(12) United States Patent
Botti et al.

(10) Patent No.: US 11,120,122 B2
(45) Date of Patent: Sep. 14, 2021

(54) AUGMENTING PASSWORD GENERATION AND VALIDATION

(71) Applicant: International Business Machines Corporation, Armonk, NY (US)

(72) Inventors: Derek Wayne Botti, Holly Springs, NC (US); Elizabeth Daly, Dublin (IE); Martin Stephenson, Ballynacargy (IE); Spyridon Antonatos, Dublin (IE); Stefano Braghin, Blanchardstown (IE)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 16/038,523

(22) Filed: Jul. 18, 2018

(65) Prior Publication Data

US 2020/0026847 A1    Jan. 23, 2020

(51) Int. Cl.
| | | |
|---|---|---|
| *G06F 21/46* | (2013.01) | |
| *G06F 21/60* | (2013.01) | |
| *G06F 21/57* | (2013.01) | |
| *G06F 16/951* | (2019.01) | |

(52) U.S. Cl.
CPC ............ *G06F 21/46* (2013.01); *G06F 16/951* (2019.01); *G06F 21/577* (2013.01); *G06F 21/604* (2013.01)

(58) Field of Classification Search
CPC ...... G06F 21/577; G06F 16/951; G06F 21/46; G06F 21/604
See application file for complete search history.

(56) References Cited

U.S. PATENT DOCUMENTS

| | | | |
|---|---|---|---|
| 7,865,958 B2 | 1/2011 | Lieblich et al. | |
| 8,959,644 B2 | 2/2015 | Schechter et al. | |
| 9,379,896 B1* | 6/2016 | Altman | H04L 9/3236 |
| 9,563,768 B2 | 2/2017 | Li et al. | |
| 2010/0057686 A1* | 3/2010 | Breiner | G06F 16/951 |
| | | | 707/E17.108 |
| 2014/0325622 A1* | 10/2014 | Luk | H04L 63/0823 |
| | | | 726/6 |

(Continued)

OTHER PUBLICATIONS

Jieling Zhang • Sirapat Boonkrong; Dynamic Salt Generating Scheme Using Seeds Warehouse Table Coordinates; 2015 2nd International Conference on Information Science and Security (ICISS) (pp. 1-6); (Year: 2015).*

(Continued)

*Primary Examiner* — Luu T Pham
*Assistant Examiner* — Chao Wang
(74) *Attorney, Agent, or Firm* — Kurt Goudy; Otterstedt, Wallace & Kammer, LLP

(57) ABSTRACT

To improve the security performance of a computer system, a retrieval component executing on at least one hardware processor obtains a list of known compromised passwords. A validation component executing on the at least one hardware processor obtains a specification of a putative password and risk-scores the putative password based at least in part on presence of the putative password in the list of known compromised passwords. The system obtains a specification of an actual password chosen in accordance with the risk score of the putative password. Access to at least one aspect of the computer system is controlled based on the actual chosen password.

17 Claims, 7 Drawing Sheets

(56) References Cited

U.S. PATENT DOCUMENTS

| | | | | |
|---|---|---|---|---|
| 2014/0373088 | A1* | 12/2014 | Aggarwal | G06F 21/604 |
| | | | | 726/1 |
| 2017/0155675 | A1 | 6/2017 | Howe | |
| 2017/0346797 | A1* | 11/2017 | Yedidi | H04L 63/14 |
| 2019/0057210 | A1* | 2/2019 | Aelkatwad | G06F 21/31 |

OTHER PUBLICATIONS

Isha Pandya • Surmeet Jhajj • Renuka Pawar; A steganographic approach to mitigate password attacks; 2017 International Conference on Advances in Computing, Communications and Informatics (ICACCI) (pp. 248-253); (Year: 2017).*

Deepak Vishwakarma • C. E. Veni Madhavan; Efficient dictionary for salted password analysis; 2014 IEEE International Conference on Electronics, Computing and Communication Technologies (CONECCT) (pp. 1-6); (Year: 2014).*

Devillers, Martin M.A., "Analyzing Password Strength," Radboud University Nijmegen, Tech. Rep 2 (2010), 10 pages.

Eugene H. Spafford, "OPUS: Preventing Weak Password Choices", Purdue Technical Report CSD-TR 92-028, 12 pages Jun. 1991.

Matt Bishop, Daniel V. Klein, "Improving System Security via Proactive Password Checking", Computers & Security, vol. 14, Issue 3, 1995, pp. 233-249.

Ari Juels and Ronald L. Rivest, "Honeywords: making password-cracking detectable". Proceedings of the 2013 ACM SIGSAC conference on Computer & Communications Security, p. 145-159.

Claude Castelluccia, et al., "Adaptive Password-Strength Meters from Markov Models", Proceedings of the NDSS 2012 conference, 14 pages.

Chris Davies and Ravi Ganesan, "BApasswd: A New Proactive Password Checker", Proceedings of the National Computer Security Conference '93, the 16th NIST/NSA conference, p. 1-15.

RW Proctor, et al., "Improving computer security for authentication of users: influence of proactive password restrictions", Behavior Research Methods, Instruments and Computers, 2002, 34(2), p. 163-169.

Daniel V. Klein., "Foiling the cracker: A survey of, and improvements to, password security". Proceedings of the 2nd USENIX Security Workshop, 5-14, 1990.

Jeff Yan., "A note on proactive password checking". In Proceedings of the 2001 workshop on New security paradigms (NSPW '01). ACM, New York, NY, USA, 127-135. 2001.

Siddharth, "Build a Simple Password Strength Checker" downloaded Jul. 3, 2018 from https://code.tutsplus.com/tutorials/build-a-simple-password-strength-checker-net-7565, Nov. 4, 2009, 26 pages.

Vvatanabe, "Five Algorithms to Measure Real Password Strength", Apr. 27, 2016, downloaded Jul. 3, 2018 from https://nulab-inc.com/blog/nulab/password-strength/, 9 pages.

"How to Determine Password Strength—cPanel Knowledge Base—cPanel Documentation", downloaded Jul. 3, 2018 from https://documentation.cpanel.net/display/CKB/How+to+Determine+Password+Strength, 2 pages.

Wikipedia—Password strength, https://en.wikipedia.org/wiki/Password_strength 11 pages, downloaded Jul. 3, 2018.

Password Strength Checker webpage, http://www.passwordmeter.com/ The Password Meter, 3 pages, downloaded Jul. 3, 2018.

* cited by examiner

AUGMENTING PASSWORD GENERATION AND VALIDATION

TECHNICAL FIELD

The present invention relates to the electrical, electronic, and computer arts, and more specifically, to computer security and related technologies.

BACKGROUND

As computers and other electronic devices have become ubiquitous, users typically have many different passwords controlling access to a variety of devices and services. Users tend to employ easy and memorable passwords; very few people use password managers to generate random passwords. Furthermore, users tend to re-use their passwords across different devices and services.

Unfortunately, hackers and other nefarious actors attempt to "crack" passwords, obtain passwords through inappropriate techniques, and/or secure unauthorized access to devices and services.

SUMMARY

Embodiments of the present disclosure provide techniques for augmenting password generation and validation. According to an embodiment of the present invention, an exemplary method for improving the security performance of a computer system includes, with a retrieval component executing on at least one hardware processor, obtaining a list of known compromised passwords; with a validation component executing on the at least one hardware processor, obtaining a specification of a putative password; with the validation component executing on the at least one hardware processor, risk-scoring the putative password based at least in part on presence of the putative password in the list of known compromised passwords; obtaining, at the computer system, a specification of an actual password chosen in accordance with the risk score of the putative password; and controlling access to at least one aspect of the computer system based on the actual chosen password.

According to another embodiment of the present invention, an exemplary apparatus includes a memory; at least one processor, coupled to the memory; and a non-transitory computer readable medium including computer executable instructions which when loaded into the memory cause the at least one processor to: instantiate a retrieval component and instantiate a validation component. The instructions further cause the at least one processor to, with the retrieval component, obtain a list of known compromised passwords; with the validation component, obtain a specification of a putative password; with the validation component, risk-score the putative password based at least in part on presence of the putative password in the list of known compromised passwords; obtain a specification of an actual password chosen in accordance with the risk score of the putative password; and control access to at least one aspect of the computer system based on the actual chosen password.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

enhanced computer security through more robust passwords; and protection from a false sense of security in seemingly robust/complex/long passwords that have been hacked and are thus no longer safe.

These and other features and advantages of the present invention will become apparent from the following detailed description of illustrative embodiments thereof, which is to be read in connection with the accompanying drawings.

DETAILED DESCRIPTION

Figure 1:
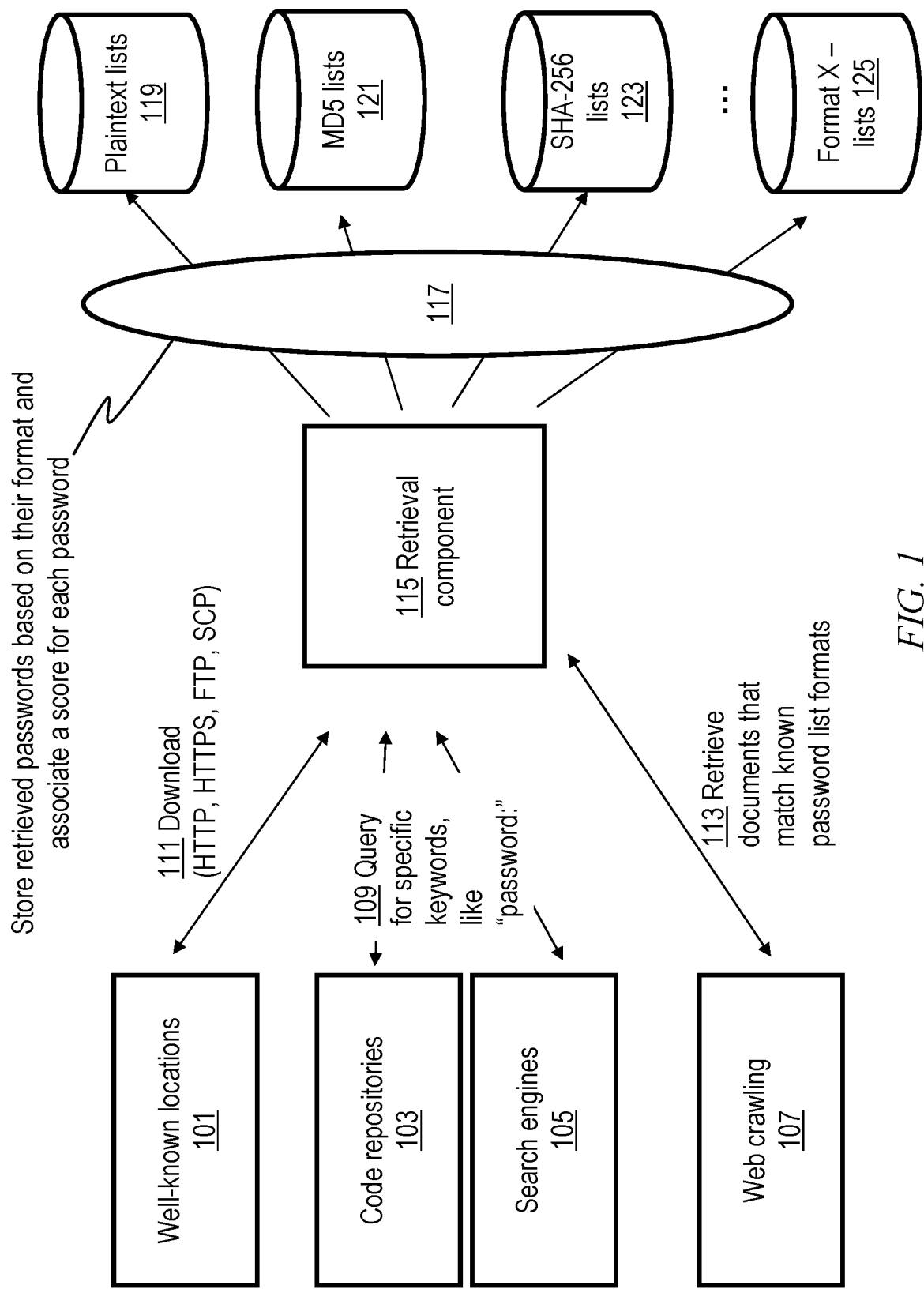
FIG. 1 presents a combined flow chart and block diagram of a retrieval component, according to an aspect of the invention.

As noted, as computers and other electronic devices have become ubiquitous, users typically have many different passwords controlling access to a variety of services. Users tend to employ easy and memorable passwords; very few people use password managers to generate random passwords. Furthermore, users tend to re-use their passwords across different services.

Unfortunately, hackers and other nefarious actors attempt to "crack" passwords, obtain passwords through inappropriate techniques, and/or secure unauthorized access to services. When sites and/or services are hacked, password lists may become public. For example, an attacker can extract password lists through brute-force attacks and post them online.

Systems that manage passwords, such as operating systems or active directory servers, invoke password strength measures or check against small scale dictionaries (for example the English dictionary) but ignore public information. The scale of publicly available password lists is massive; the order is hundreds of millions.

One or more embodiments provide a method and/or system to augment the robustness of password generation and validation systems by detecting password lists through active crawling for password lists and appending these lists to the dictionary data of the aforesaid password generation and validation systems. Indeed, one or more embodiments advantageously provide a method and/or system to crawl for publicly (and legitimately) available password lists and store these lists for password validation and generation purposes (in essence, retrieving password dictionaries including already-exploited passwords). One or more embodiments do not store username/user ID or any other information in association with the retrieved passwords. One or more embodiments extend the password strength checks to include lists of publicly available password lists in order to avoid re-use. Indeed, one or more embodiments encourage users to select more secure passwords not seen in public before. For the avoidance of doubt, embodiments of the invention are not intended to obtain passwords nefariously, but rather to protect innocent users from use of passwords that have been obtained nefariously by others or otherwise compromised.

One or more embodiments need not rely on a set of rules, but rather employ actual data. One or more embodiments identify weak passwords by computing the similarity between a user password and passwords that have been released in public datasets as part of previous hacking exploits.

One or more instances are applicable to any product and/or service that performs password management. For example, one or more embodiment leverage on huge password lists of previously hacked sites and services and sources that expose potential password information, to protect users from harm associated with use of compromised passwords. In another aspect, one or more embodiments actively (and legitimately) crawl publicly available websites in order to detect and retrieve password lists. One or more instances provide a method and/or system to check a password against external sources (i.e., the retrieved passwords).

One or more embodiments provide a mechanism to build a knowledge base used to check the robustness of passwords and a system (optionally a distributed system) for verifying such robustness. One or more instances do not compute password robustness by estimating entropy, but rather by checking whether a password appears in security breach reports. Disclosed herein is a mechanism to enrich the knowledge base of such reports. In some instances, however, entropy can be used as one of a number of scoring factors (i.e., in combination with one or more other scoring factors such as whether found on "hacked" list, whether used internally or externally, and so on). In this regard, internal passwords are generally lower-risk than passwords used for public services or accounts.

Password lists are publicly available or can be mined (legitimately) from existing sources. Public password lists can originate either from: a) word lists created by users or systems or b) password dumps from already hacked sites and services. Password lists can be extracted from well-known locations and/or obtained by active crawling for password lists and references. For example, a query search for "password:" on GitHub repositories provides a good source for passwords.

Figure 2:
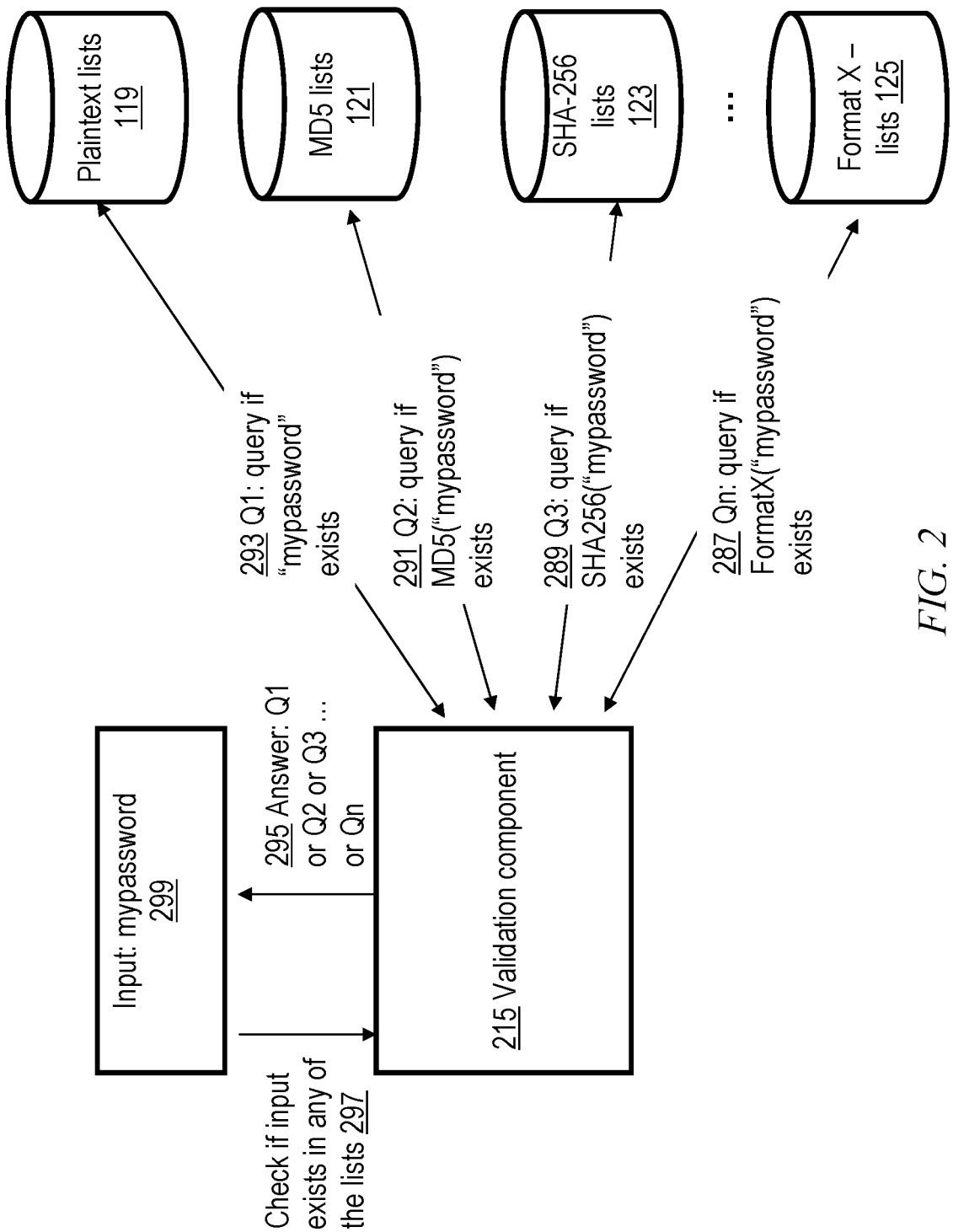
FIG. 2 presents a combined flow chart and block diagram of a validation component, according to an aspect of the invention.

In one or more embodiments, a method and/or system includes two components: a password list retrieval component (FIG. 1) and a password validation component (FIG. 2). Referring first to FIG. 1, the retrieval component 115 downloads password lists from well-known sources 101, as seen at 111, and also performs active crawling to locate new sources. As seen at 109, active crawling can include search queries with specific keywords on public websites, such as search engines 105 or code repositories 103. As seen at 113, active crawling can also include generic web crawling 107 (i.e., using known web crawlers used for indexing web sites) and matching against predefined password list formats. In most cases, password files are long lists and are either plaintext or hashed values, one entry per line. Standard formats, such as UNIX shadow files, can also be retrieved through web crawling.

As seen at 117, each retrieved password is associated with a score, based on features such as whether the source is public, password characteristics (length, strength), password frequency across sources, and the like. The retrieved passwords are then stored based on their format; e.g., plaintext lists in database 119; MD5 lists in database 121; SHA-256 lists in database 123; and "Format X" (arbitrary format corresponding to "nth" query, e.g.) lists in database 125. Further regarding step/element 117, in one or more embodiments, risk scoring is carried out with a validation component 215 (FIG. 2). This step can be carried out in response to a query; or can be done as soon as a password is retrieved; or at some intermediate time. These aspects are discussed further below.

Referring now to FIG. 2, the validation component 215 takes as an input a plaintext password 299, runs a check as at 297, and, as seen at 295, advises if the password is present on any of the retrieved password lists as well as its risk score. The retrieved password lists can be in multiple formats, for example plaintext 119, MD5 hashes 121, SHA256 hashes 123, "Format X" lists in database 125, and the like. In one or more embodiments, a query is issued for each stored format since the password lists are in multiple formats; see queries Q1, Q2, Q3 . . . Qn at 293, 291, 289, and 287. The answers to queries Q1, Q2, Q3 . . . Qn are either true or false in one or more embodiments.

One or more embodiments thus provide a system and/or method to collect and discover a repository of known passwords from various resources. The system provides an interface to return a risk score associated with an input password representing the risk associated with using this password. In some instances, a password repository manager automatically identifies and extracts passwords from a collection of sources. The system assesses a risk score associated which each collection source e.g. (e.g. GitHub repository inside an organization vs. a password on an open internet website).

In some embodiments, a user or service may submit a possible password and retrieve a risk score associated with this password. The risk score includes, for example:

The existence of the password in the public domain (taken as an input);

A weight based on the risk score associated with the password source;

Characteristics of the password e.g. length, entropy—these features are customizable in one or more embodiments—a number of currently available tools can be used to estimate password strength; and/or The frequency with which the password is found (taken as an input).

Referring now to FIGS. 4A-4D, consider a non-limiting example of a detailed risk evaluation technique, according to an aspect of the invention. Initially focusing on FIG. 4A, the method begins in step 401. In step 403, initialize the store number for hashed/salted compromised passwords (e.g., 1). In step 405, determine whether a putative password is present in the initial hashed/salted compromised password store. If not, proceed to step 413 and increment the store number for hashed/salted compromised passwords (e.g., 1+1=2). Then, as per step 414, return to 405 and determine whether the putative password is present in the next hashed/salted compromised password store (unless all hashed/salted compromised password stores have been checked, in which case proceed to step 415 in FIG. 4B). On the other hand, if the putative password is present in the initial hashed/salted compromised password store, reduce its strength score by a predetermined percentage in step 407 and then proceed to decision block 409 to determine whether the password source is external to the organization, in which case reduce strength by an additional predetermined percentage in step 411 and then proceed to step 413; else, proceed to step 413 without further reduction. This continues until the putative password has been checked against all hashed/salted compromised password stores; then, as noted, proceed to step 415 in FIG. 4B.

Figure 4A:
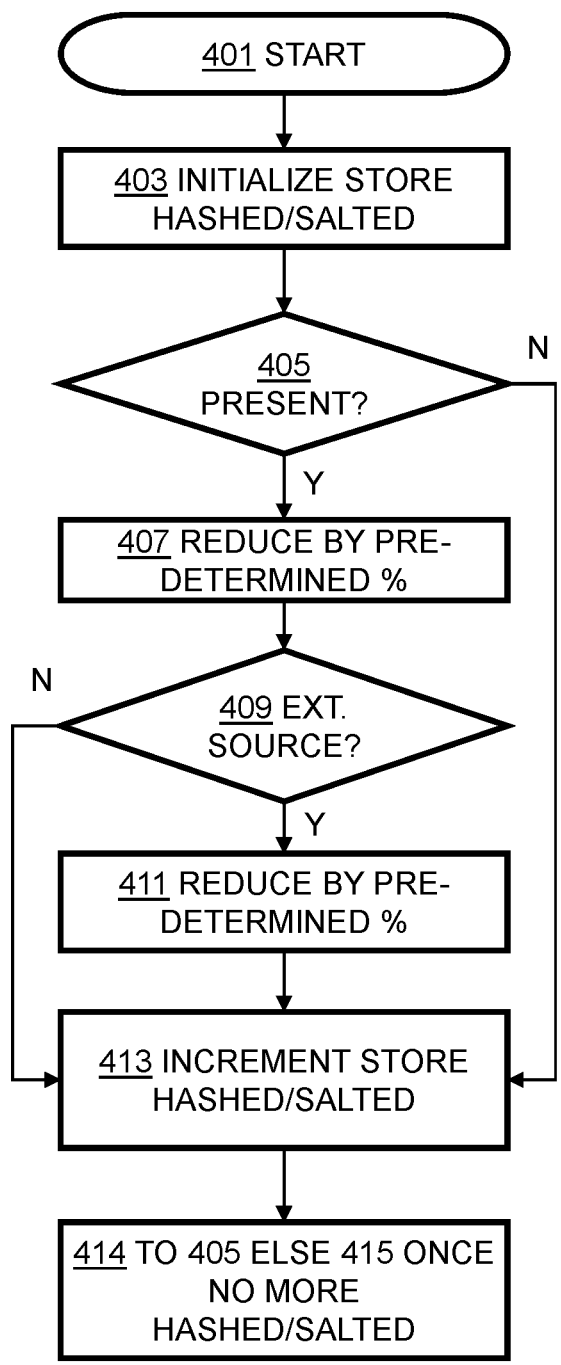
FIG. 4A, FIG. 4B, FIG. 4C, and FIG. 4D show flow charts of an exemplary method, according to an aspect of the invention.
Figure 4B:
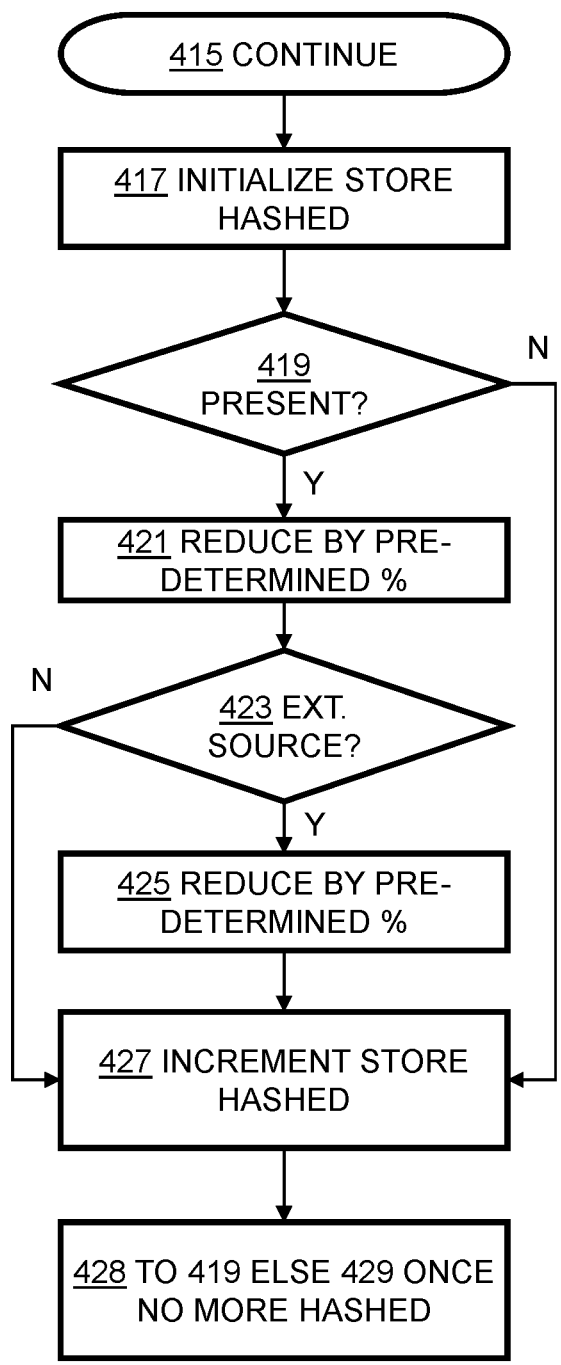

Now focusing on FIG. 4B, the method continues in step 415. In step 417, initialize the store number for hashed (but not salted) compromised passwords (e.g., 1). In step 419, determine whether the putative password is present in the initial hashed (but not salted) compromised password store. If not, proceed to step 427 and increment the store number for hashed/salted compromised passwords (e.g., 1+1=2). Then, as per step 428, return to 419 and determine whether the putative password is present in the next hashed (but not salted) compromised password store (unless all hashed (but not salted) compromised password stores have been checked, in which case proceed to step 429 in FIG. 4C). On the other hand, if the putative password is present in the initial hashed (but not salted) compromised password store, reduce its strength score by a predetermined percentage in step 421 and then proceed to decision block 423 to determine whether the password source is external to the organization, in which case reduce strength by an additional predetermined percentage in step 425 and then proceed to step 427; else, proceed to step 427 without further reduction. This continues until the putative password has been checked against all hashed (but not salted) compromised password stores; then, as noted, proceed to step 429 in FIG. 4C.

Figure 4C:
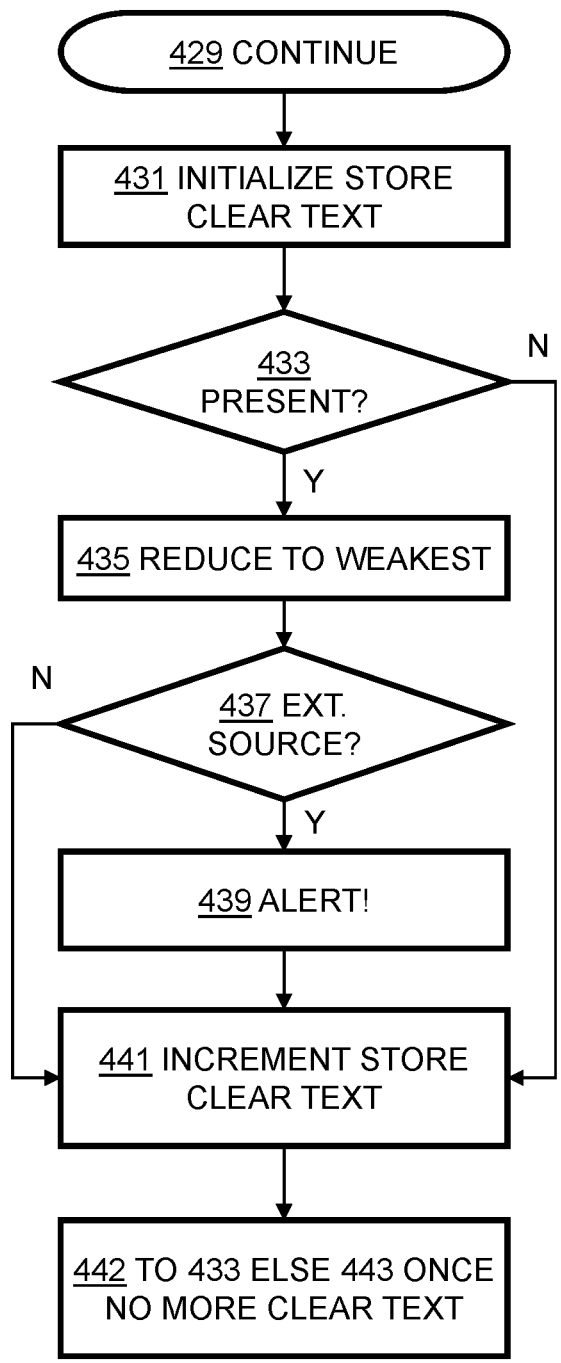

Now focusing on FIG. 4C, the method continues in step 429. In step 431, initialize the store number for clear text compromised passwords (e.g., 1). In step 433 determine whether the putative password is present in the initial clear text compromised password store. If not, proceed to step 441 and increment the store number for clear text compromised passwords (e.g., 1+1=2). Then, as per step 442, return to 433 and determine whether the putative password is present in the next clear text compromised password store (unless all clear text compromised password stores have been checked, in which case proceed to step 443 in FIG. 4D). On the other hand, if the putative password is present in the initial clear text compromised password store, reduce its strength score to the weakest value in step 435 and then proceed to decision block 437 to determine whether the password source is external to the organization, in which case send an immediate alert in step 439 warning that the password is in clear text in a known external source of compromised passwords, and then proceed to step 441; else, proceed to step 441 without sending the immediate alert. This continues until the putative password has been checked against all clear text compromised password stores; then, as noted, proceed to step 443 in FIG. 4D.

Note that the percentage reduction in steps 407, 411, 421, 425, can be the same or different in each step and can be set by the skilled artisan based on rules appropriate for each case (balancing safety versus convenience). Further, the reduction could be specified as a fraction or decimal instead of a percentage, could be a predetermined decrement by a certain value, or the like.

Figure 4D:
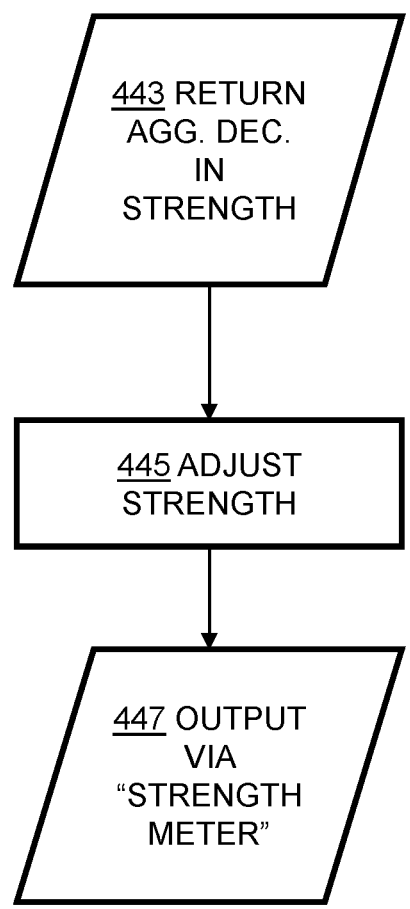

In step 443 of FIG. 4D, return (to a suitable strength algorithm) the aggregate decrease in strength from FIGS. 4A-4C. In step 445, the strength algorithm adjusts password strength based on the aggregate decrease from step 443. In step 447, the adjusted strength is output to the user via a "strength meter" such as a graphical representation of password strength; as a numerical score (e.g. on a scale of 1-10 or 1-100); as a text value (e.g., very weak, weak, moderate, strong, very strong), or the like. The skilled artisan will be familiar with many common password strength estimation techniques that can be used with one or more techniques disclosed herein; see, for example:

"OPUS: Preventing Weak Password Choices," Eugene H. Spafford, Purdue Technical Report CSD-TR 92-028, June 1991, hereby expressly incorporated by reference herein in its entirety for all purposes;

"Improving System Security via Proactive Password Checking," Matt Bishop and Daniel V. Klein, Computers & Security, Volume 14, Issue 3, 1995, Pages 233-249, hereby expressly incorporated by reference herein in its entirety for all purposes;

"Adaptive Password-Strength Meters from Markov Models," Claude Castelluccia et al., Proceedings of the NDSS (Network & Distributed System Security Symposium) 2012 conference, 5 Feb. to 8 Feb. 2012, Hilton San Diego, hereby expressly incorporated by reference herein in its entirety for all purposes;

"BApasswd: A New Proactive Password Checker," Chris Davies and Ravi Ganesan, Proceedings of the National Computer Security Conference 1993, the 16th NIST/NSA conference, hereby expressly incorporated by reference herein in its entirety for all purposes;

Klein, Daniel V., "Foiling the Cracker; A Survey of, and Improvements to Unix Password Security," *Proceedings of the 14th DoE Computer Security Group*, May 1991 (1991), 5-14, hereby expressly incorporated by reference herein in its entirety for all purposes;

"A note on proactive password checking," Jianxin Jeff Yan, In Proceedings of the 2001 workshop on New security paradigms (NSPW '01), ACM, New York, N.Y., USA, 127-135, hereby expressly incorporated by reference herein in its entirety for all purposes.

One or more embodiments are applicable to a variety of products and services that manage passwords, such as operating systems, security products, password managers, active directory servers, and the like. Some embodiments can be used, for example, for a single sign-on (SSO) management system.

One or more embodiments augment password strength detection systems, and do not need to monitor network traffic to warn about potentially compromised sites. One or more embodiments do not need to assume that the password exists in a store and do not need to check a store to see how many times the combination has been used, but rather compare the submitted password to known locations with lists of compromised passwords to determine if the password being used has been compromised before.

One or more embodiments do not need to assign risk of access to confidential information and/or do not need to potentially change trust factors for a user based on knowledge obtained by the environment. Furthermore, one or more embodiments do not assume a known community of users to compare passwords to one another and determine a score of popularity, but rather determine whether a submitted password, regardless of how popular, has potentially been compromised. Yet further, one or more instances are not limited to a binary yes/no decision for compromised passwords, or a forcing of expiration of compromised passwords, but rather provide risk scoring of the password strength—rather than denying access or forcing expiration, one or more embodiments instead provide the ability to increase or decrease strength of the submitted password based on the risk score from the method.

Even further, one or more embodiments do not impose a dictionary search or static lists to determine password strength but instead augment strength checking algorithms to indicate a password's weakness given that it was compromised.

It is worth noting that public lists are used by attackers to break any service(s) that require username and password. If a hacker is trying to break into a service and he or she has a valid password, then the hacker only needs to find the username associated with that password. Hackers thus will try hacked passwords in attempts to gain access. Accordingly, if password "P*ssw0rd" previously associated with user Mary Smith has been hacked, even if "P*ssw0rd" is otherwise "strong," it is dangerous for a different user John Jones to use "P*ssw0rd" as a hacker will try to gain illicit entry using known hacked passwords.

Thus, by way of review and provision of further detail, users tend to enter simple passwords. Users further tend to reuse those passwords across multiple environments. Once a system has been compromised, any other system that uses that same user and password combination could be attacked. One or more embodiments provide a method and/or system that provides an additional layer of control over password creation by checking user submissions against known hacked password stores.

Current techniques employ dictionary lookup and storage of static disallowed password choices; utilize various forms of password strength rules; or employ hashing algorithms associated with password storage. One or more embodiments provide a method to generate a store of known compromised passwords to facilitate rules based validation of passwords submitted to an identity store to ensure the password used is not one of a known universe of compromised passwords. One or more embodiments hold a list of known dark web sites that house stores of data related to compromised user identities and passwords. One or more embodiments crawl those locations to collect the data for use as a comparison to the submitted user password. If the submitted password is found in one of those stores, one or more embodiments provide a warning to the identity management store indicating the password is known to have been compromised in the past.

One or more embodiments thus solve a problem unique to computers and/or improve the functioning of a computer; for example, enhancing computer security through more robust passwords and/or protecting the user from a false sense of security in seemingly robust/complex/long passwords that have been hacked and are thus no longer safe. In one or more embodiments, these benefits are obtained by embedding a password service, a validation component, and optionally a retrieval component in a web browser of the computer of the user to be protected.

Given the discussion thus far, it will be appreciated that, in general terms, an exemplary method for improving the security performance of a computer system includes, with a retrieval component 115 executing on at least one hardware processor (e.g., 302), obtaining a list of known compromised passwords (e.g., FIG. 1 109, 111, 113). A further step 297 includes, with a validation component 215 executing on the at least one hardware processor, obtaining a specification of a putative password 299. A still further step includes, with the validation component executing on the at least one hardware processor, risk-scoring the putative password based at least in part on presence of the putative password in the list of known compromised passwords. This step can be carried out in response to a query; or can be done as soon as a password is retrieved; or at some intermediate time. In one or more embodiments, the step is preferably carried out in response to a query (during runtime), rather than earlier, as this permits ready addition of new features/factors, as compared to an embodiment where risk storing was calculated at some earlier time.

Figure 3:
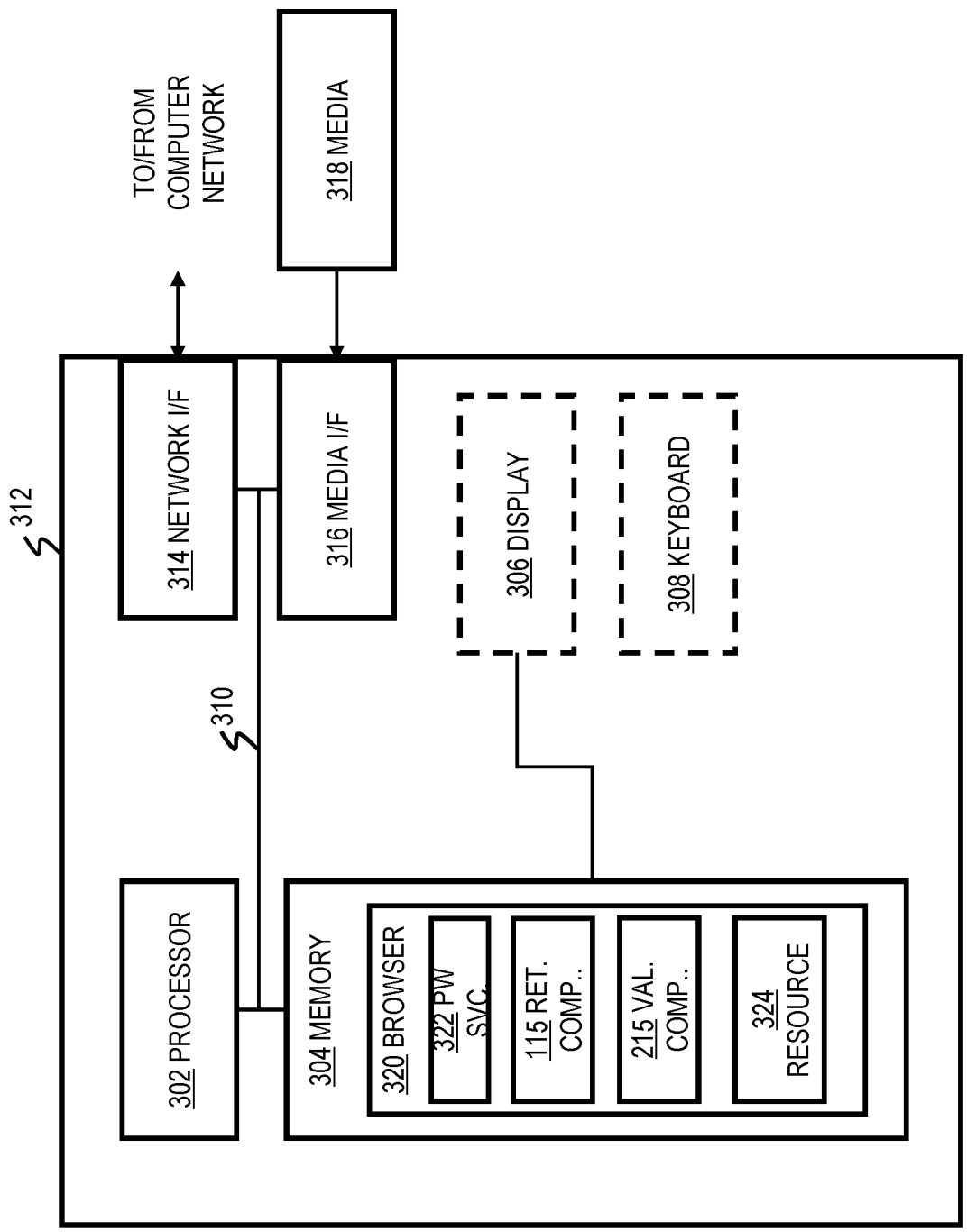
FIG. 3 depicts a computer system, according to an aspect of the invention.

An even further step includes obtaining, at the computer system, a specification of an actual password chosen in accordance with the risk score of the putative password. Referring to FIG. 3, in an exemplary use case, one or more embodiments are embedded in a browser 320 to assist the user in selecting passwords. Embodiments can also be used, for example, in a corporate single sign-on (SSO) system. Still a further step includes controlling access to at least one aspect (i.e., hardware resource and/or software program 324) of the computer system based on the actual chosen password (e.g. allow access to resource 324 if user supplies selected password via keyboard 308 or else deny). Resource 324 is shown as accessible within browser 320 (web-based resource) but this is not a limitation.

Where the risk score is acceptable, the actual chosen password can be identical to the putative password. On the other hand, where the risk score is not acceptable, the actual chosen password can be different than the putative password.

As noted above, and referring to FIG. 1, a variety of techniques can be used to obtain the list of known compromised passwords; for example, downloading from known sources of compromised passwords, as at 101, 111; or active crawling. Active crawling can include, for example, querying on at least one specific keyword on at least one of a search engine and a code repository, as at 103, 105, 109; or matching against predefined password list formats, as at 107, 113.

Various techniques can be used for the scoring aspect. For example, the scoring could include weighting based on public availability of source, length, strength, entropy, and frequency across sources.

Referring to FIGS. 1 and 2, including elements 119, 121, 123, and 125 thereof, in one or more embodiments, the known compromised passwords are obtained and stored in a plurality of formats; and the risk scoring of the putative password includes separately querying in each of the stored formats.

Referring again to FIGS. 4A-4D, in one or more embodiments, said risk scoring includes steps 403, 405, 413 querying those of the stored formats corresponding to hashed and salted passwords; step 407, decreasing an initial password strength by a first predetermined amount for a given putative password found in the stored formats corresponding to hashed and salted passwords, to obtain a first revised score; steps 417, 419, 427, querying those of the stored formats corresponding to hashed but not salted passwords; step 425, decreasing the first revised score by a second predetermined amount for the given putative password responsive to the given putative password being found in the stored formats corresponding to the hashed but not salted passwords, to obtain a second revised score; steps 431, 433, 441, querying those of the stored formats corresponding to clear text passwords; and step 435, decreasing the second revised score to a weakest possible value for the given putative password responsive to the given putative password being found in the stored formats corresponding to the clear text passwords, to obtain a third revised score.

In one or more instances, the risk scoring further includes step 411, decreasing the first revised score by a third predetermined amount when the given putative password is found to be external in the stored formats corresponding to hashed and salted passwords (in step 409); and step 425, decreasing the second revised score by a fourth predetermined amount when the given putative password is found to be external in the stored formats corresponding to hashed but not salted passwords (in step 403).

In one or more embodiments, a further step 439 includes issuing an alert when the given putative password is found to be external in the stored formats corresponding to the clear text passwords.

One or more instances include calculating the initial password strength with a separate password service; and returning the third revised score to the separate password service in step 443.

One or more embodiments further include embedding the separate password service 322 and the validation component 215 in a browser 320 executing on the at least one hardware processor to assist a user in password selection. Optionally, a further step includes embedding the retrieval component 115 in the browser.

In another aspect, referring to FIG. 3, an exemplary apparatus includes a memory (e.g. on-chip, RAM or ROM portion of 304); at least one processor 302, coupled to the memory; and a non-transitory computer readable medium (e.g., non-volatile portion of 304 such as a hard drive) including computer executable instructions which when loaded into the memory cause the at least one processor to instantiate a retrieval component 115; instantiate a validation component 215; obtain a list of known compromised passwords with the retrieval component; obtain a specification of a putative password with the validation component; risk-score the putative password with the validation component based at least in part on presence of the putative password in the list of known compromised passwords; obtain a specification of an actual password chosen in accordance with the risk score of the putative password; and control access to at least one aspect of the computer system based on the actual chosen password.

In one or more embodiments, the non-transitory computer readable medium further includes computer executable instructions which when loaded into the memory cause the at least one processor to be further operative to: instantiate a separate password service; calculate an initial password strength with the separate password service, wherein the risk-scoring includes reducing the initial password strength; and return the reduced initial password strength to the separate password service.

In one or more instances, the non-transitory computer readable medium further includes computer executable instructions which when loaded into the memory cause the at least one processor to be further operative to: instantiate a browser; and embed the separate password service and the validation component in the browser. Optionally, the non-transitory computer readable medium further includes computer executable instructions which when loaded into the memory cause the at least one processor to be further operative to embed the retrieval component in the browser.

Exemplary System

As will be appreciated by one skilled in the art, and as discussed in detail elsewhere herein, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects.

One or more embodiments of the invention, or elements thereof, can be implemented in the form of an apparatus including a memory and at least one processor that is coupled to the memory and operative to perform exemplary method steps.

One or more embodiments can make use of software running on a processor of a general purpose computer or workstation. With reference to FIG. 3, such an implementation might employ, for example, a processor 202, a memory 304, and an input/output interface formed, for example, by a display 306 and a keyboard 308. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 302, memory 304, and input/output interface such as display 306 and keyboard 308 can be interconnected, for example, via bus 310 as part of a data processing unit 312. Suitable interconnections, for example via bus 310, can also be provided to a network interface 314, such as a network card, which can be provided to interface with a computer network, and to a media interface 316, such as a diskette or CD-ROM drive, which can be provided to interface with media 318.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 302 coupled directly or indirectly to memory elements 304 through a system bus 310. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 308, displays 306, pointing devices, and the like) can be coupled to the system either directly (such as via bus 310) or through intervening I/O controllers (omitted for clarity).

Network adapters such as network interface 314 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 312 as shown in FIG. 3) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the elements depicted in the block diagrams and/or described herein. For example, referring again to FIGS. 1-3, the modules could include browser 320 with embedded password service 322, retrieval component 115, validation component 215, and a resource 324 accessed by browser 320 or otherwise. The method steps can then be carried out using the distinct software modules/routines and/or sub-modules/subroutines of the system, as described above, executing on one or more hardware processors 302. Further, a computer program product can include a computer-readable storage medium with code adapted to be implemented to carry out one or more method steps described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

Computer Program Products

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for improving a security performance of a computer system, said method comprising:
    obtaining, by a validation component executing on at least one hardware processor of said computer system, a specification of a putative password including an initial strength of said putative password;
    accessing a plurality of stores of known passwords, the plurality of stores of known passwords comprising at least one store corresponding to hashed and salted passwords, at least one store corresponding to hashed but not salted passwords, and at least one store corresponding to clear text passwords;
    risk-scoring, by said validation component executing on said at least one hardware processor, said putative password by reducing said initial strength of said putative password by a predetermined amount for each instance of said putative password in said plurality of stores of known passwords comprising said at least one store corresponding to hashed and salted passwords, said at least one store corresponding to hashed but not salted passwords, and said at least one store corresponding to clear text passwords;
    obtaining, at said computer system, a specification of an actual password chosen in accordance with said risk score of said putative password;
    controlling access to at least one aspect of said computer system based on said actual chosen password; and
    issuing an alert when said putative password is found to be external in said at least one store corresponding to said clear text passwords.

2. The method of claim 1, wherein said actual chosen password is identical to said putative password, based on said risk-scoring indicating acceptable risk.

3. The method of claim 1, wherein said actual chosen password is different than said putative password, based on said risk-scoring indicating unacceptable risk.

4. The method of claim 1, further comprising:
    obtaining, from said plurality of stores, access to said known passwords; and
    downloading said known passwords from said plurality of stores.

5. The method of claim 1, further comprising crawling a network of computers to locate and obtain said known passwords.

6. The method of claim 3, wherein said risk-scoring comprises weighting based at least on public availability of source, length, strength, entropy, and frequency across sources.

7. The method of claim 3, wherein:
    said known passwords are stored in a plurality of formats; and
    said risk scoring of said putative password comprises separately querying in each of said stored formats.

8. The method of claim 7, wherein said reducing said initial strength of said putative password comprises:
    querying those of said stores corresponding to hashed and salted passwords;
    decreasing said initial password strength by a first predetermined amount for said putative password found in said stores corresponding to hashed and salted passwords, to obtain a first revised score;
    querying those of said stores corresponding to hashed but not salted passwords;
    decreasing said first revised score by a second predetermined amount for said putative password responsive to said putative password being found in said stores corresponding to said hashed but not salted passwords, to obtain a second revised score;
    querying those of said stores corresponding to clear text passwords; and
    decreasing said second revised score to a weakest possible value for said putative password responsive to said putative password being found in said stores corresponding to said clear text passwords, to obtain a third revised score.

9. The method of claim 8, wherein said risk scoring further comprises:

decreasing said first revised score by a third predetermined amount when said putative password is found to be external in said stores corresponding to hashed and salted passwords; and decreasing said second revised score by a fourth predetermined amount when said putative password is found to be external in said stores corresponding to hashed but not salted passwords.

10. The method of claim 8, further comprising:

calculating said initial password strength with a separate password service;

and returning said third revised score to said separate password service.

11. The method of claim 10, further comprising embedding said separate password service and said validation component in a browser executing on said at least one hardware processor to assist a user in password selection.

12. The method of claim 11, further comprising embedding a retrieval component in said browser.

13. A non-transitory computer readable medium comprising computer executable instructions which when executed by a computer cause the computer to perform a method for improving the security performance of the computer, said method comprising:

obtaining, with a validation component executing on the computer, a specification of a putative password including an initial strength of said putative password;

accessing a plurality of stores of known passwords, the plurality of stores of known passwords comprising at least one store corresponding to hashed and salted passwords, at least one store corresponding to hashed but not salted passwords, and at least one store corresponding to clear text passwords;

risk-scoring, with said validation component executing on the computer, said putative password by reducing said initial strength of said putative password by a predetermined amount for each instance of said putative password in said plurality of stores of known passwords comprising said at least one store corresponding to hashed and salted passwords, said at least one store corresponding to hashed but not salted passwords, and at least one store corresponding to clear text passwords;

obtaining, at said computer system, a specification of an actual password chosen in accordance with said risk score of said putative password;

controlling access to at least one aspect of said computer system based on said actual chosen password; and issuing an alert when said putative password is found to be external in said at least one store corresponding to said clear text passwords.

14. An apparatus comprising:

a memory;

at least one processor, coupled to said memory; and a non-transitory computer readable medium comprising computer executable instructions which when loaded into said memory cause said at least one processor to:

instantiate a retrieval component;

instantiate a validation component;

obtain, with said validation component, a specification of a putative password including an initial strength of said putative password;

access a plurality of stores of known passwords, the plurality of stores of known passwords comprising at least one store corresponding to hashed and salted passwords, at least one store corresponding to hashed but not salted passwords, and at least one store corresponding to clear text passwords;

risk-score, with said validation component, said putative password by reducing said initial strength of said putative password by a predetermined amount for each instance of said putative password in said plurality of stores of known passwords comprising said at least one store corresponding to hashed and salted passwords, said at least one store corresponding to hashed but not salted passwords, and said at least one store corresponding to clear text passwords;

obtain a specification of an actual password chosen in accordance with said risk score of said putative password;

control access to at least one aspect of said computer system based on said actual chosen password; and issue an alert when said putative password is found to be external in said at least one store corresponding to said clear text passwords.

15. The apparatus of claim 14, wherein said non-transitory computer readable medium further comprises computer executable instructions which when loaded into said memory cause said at least one processor to be further operative to:

instantiate a separate password service;

calculate said initial password strength with said separate password service, wherein said risk-scoring comprises reducing said initial password strength; and return said reduced initial password strength to said separate password service.

16. The apparatus of claim 15, wherein said non-transitory computer readable medium further comprises computer executable instructions which when loaded into said memory cause said at least one processor to be further operative to:

instantiate a browser; and embed said separate password service and said validation component in said browser.

17. The apparatus of claim 16, wherein said non-transitory computer readable medium further comprises computer executable instructions which when loaded into said memory cause said at least one processor to be further operative to embed said retrieval component in said browser.

* * * * *